INVENTOR
SARAH A. JOHNSON
BY

ATTORNEYS

United States Patent Office 3,555,848
Patented Jan. 19, 1971

3,555,848
SELF-CONTAINED PORTABLE COOLER FOR FOOD RECEPTACLES
Sarah A. Johnson, P.O. Box 69,
West Covina, Calif. 94590
Filed Sept. 9, 1968, Ser. No. 758,551
Int. Cl. F25d 3/08
U.S. Cl. 62—457               6 Claims

ABSTRACT OF THE DISCLOSURE

A self-contained, readily-portable cooler for serving-type food receptacles which cooler is adapted to be placed on a dining table during meal time and stored on a shelf between meals. The cooler houses a complete small mechanical refrigeration unit, the evaporator of which is arranged to support a food receptacle and preferably is embraced by means for trapping cool air about the sides of the receptacle. The air-trapping means is retractable for storage and adjustable to different heights when in use.

---

Figure 1:
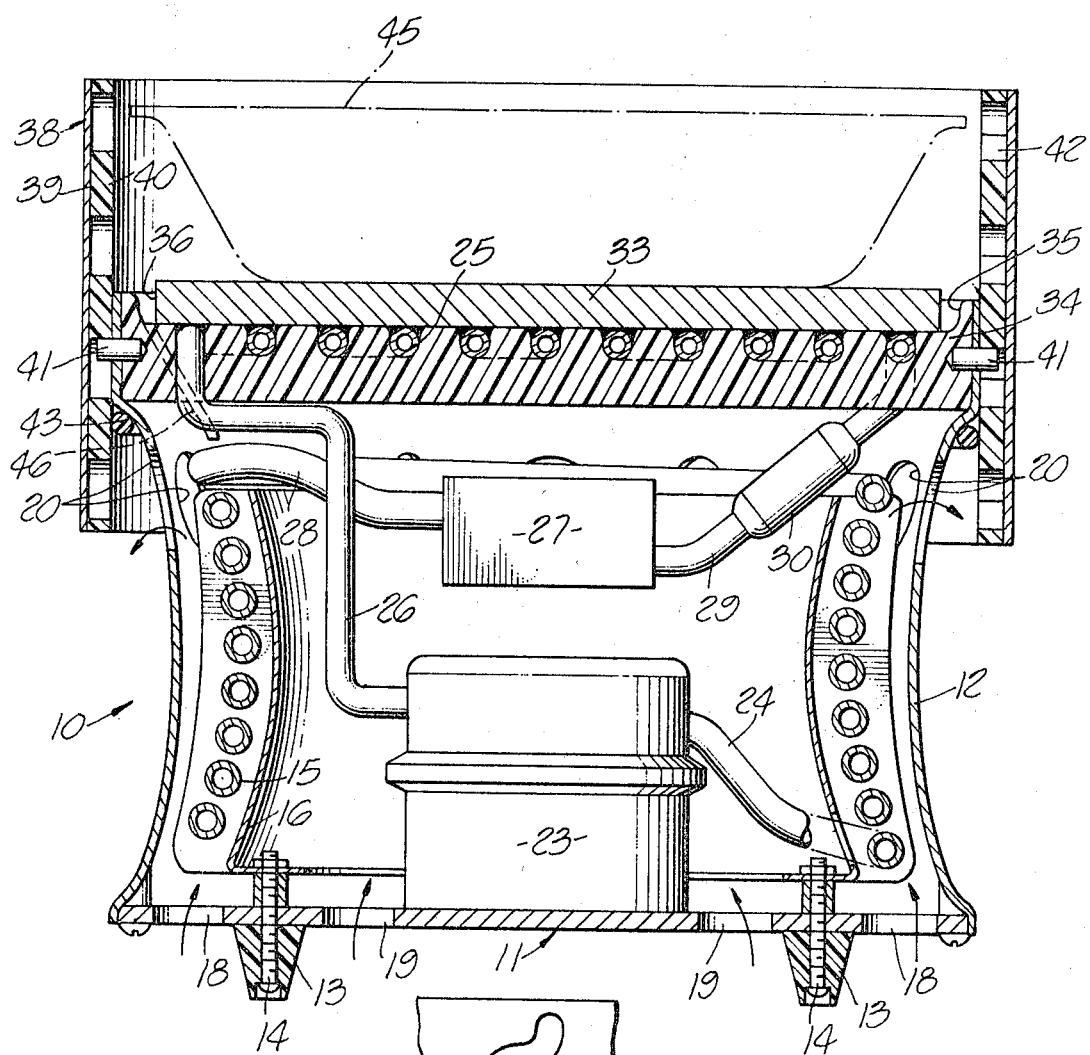

This invention relates to mechanical coolers and, more particularly, to an unusually compact, lightweight, fully self-contained unit specially designed for cooling food serving dishes and to be easily moved to a place of storage between meals.

As is well known, many foods are most palatable and appetizing when served cold. Various proposals have been made heretofore for cooling serving dishes for such foods until the contents have been served. The most common expedient, accompanied by many disadvantages and inconveniences, makes use of crushed ice. This practice requires considerable quantities of ice and some means for crushing it as well as other means for holding the ice and the melt therefrom captive. Ice is not always available in the requisite quantity and it is a nuisance to prepare the ice and maintain it to a desired level during a serving period.

It has also been the practice to store serving dishes of foodstuffs in a refrigerator until ready for serving. This has the disadvantage that cooling ceases when the dish is removed from the refrigerated space and transferred to a serving table.

To obviate the foregoing and other disadvantages and shortcomings of prior techniques for maintaining serving dishes of foodstuffs cool until the final portions are served, there is provided by this invention the unique, compact, inexpensive means to be described more fully below. In an exemplary embodiment, there is provided a fully self-contained refrigeration unit, easily moved from place to place by the housewife and having a pleasing appearance harmonizing with a wide variety of serving dishes commonly placed on the dining table or serving counter and arranged to support the serving dish directly against a refrigerated surface. All elements except the cooling surface and the cool air guard are housed within a casing and are energized through an inconspicuous electric service cord. The unit need be no larger than a typical serving dish and preferably includes means surrounding the upper portion of the casing for trapping the cooled air about the serving dish and preferably collapsible to a retracted position for storage. The condensate customarily formed from the cooled air is collected and drained automatically onto heat-dissipating portions of the refrigeration unit to increase the operating efficiency, avoiding the nuisance of having to dispose of the condensate when moving the unit into storage.

Accordingly, it is the primary object of the present invention to provide a compact fully self-contained refrigeration unit for supporting and cooling serving dishes of foods throughout a serving period.

Another object of the invention is the provision of a fully self-contained miniature refrigeration unit adapted to be placed on the dining table and used to keep food cold until served and easily moved to a storage shelf between meals.

Another object of the invention is the provision of a cooling unit for food serving dishes and featuring adjustable and retractable means for trapping cold air about the serving dish.

Another object of the invention is the provision of a self-contained portable serving dish cooler arranged to utilize condensate collecting during its operation to increase its operating efficiency.

These and other more specific objects will appear upon reading the following specification and claims and upon considering in connection therewith the attached drawing to which they relate.

Referring now to the drawing in which a preferred embodiment of the invention is illustrated.

Figure 2:
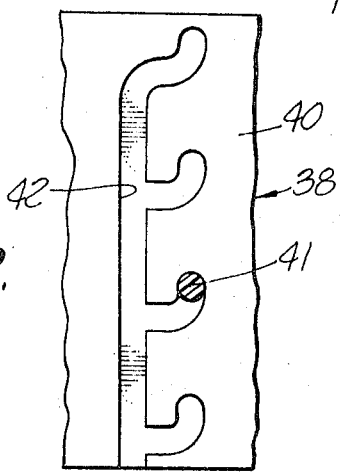

FIG. 1 is a vertical sectional view through a preferred embodiment of the invention portable serving dish cooler; and FIG. 2 is a fragmentary elevation view of a portion of the adjustable air guard member.

Referring to the drawing there is shown a preferred illustrative embodiment of the invention designated generally 10, having a main frame 11 enclosed by a main casing 12. The main casing is preferably supported on suitable non-metallic feet 13 held assembled to the main frame by screws 14. These screws also serve to secure an air-cooled condenser coil 15 of any suitable design to the main frame by means of a generally tubular bracket 16. This bracket is open at both ends and serves to direct the separate streams of cooling air upwardly over the heat-dissipating components of the refrigeration system, the air entering through rings of air inlets 18 and 19, discharging through outlets 20 about the upper periphery of the casing.

Suitably supported on the main frame interiorly of casing 12 is a unitary motor/compressor unit 23. The lower part of unit 23 houses the motor driving a compressor having its outlet opening into the lower end of condensor 15 through conduit 24 and its inlet coupled by conduit 26 to the outlet of an evaporator coil 25. The upper end of condensor 15 conveys the liquified refrigerant into receiver 27 through conduit 28. The liquid refrigerant passes to the inlet of evaporator 25 via conduit 29 and a suitable flow restrictor device 30.

As herein shown, evaporator 25 comprises a sinuous coil of good heat-conducting material, brazed or otherwise bonded to a cooling plate 33 of high-heat conductivity. Plate 33 preferably has a smooth flat horizontally disposed upper surface supported and shielded from the relatively warm underlying components of the refrigeration system by a thick heat insulator plaque 34. The latter is preferably formed with a condensate collector trough 35 surrounding the periphery 36 of cooling plate 33. This trough collects condensate condensing from air cooled by plate 33. This very cold condensate is a highly efficient coolant usable effectively in cooling condenser 15.

A feature of the invention is the provision of a vertically-adjustable tubular guard 38 closely embracing the upper periphery of casing 12. This tubular member comprises an outer ring 39 of suitable rigid material having an inner layer 40 of suitable heat-insulating material 40. Air guard member 38 is preferably adjustably supported, as by pins 41 projecting radially from the upper edge of casing 12 into notched slots 42 formed in layer 40 and loosely seating the outer ends of pins 41. A soft sponge gasket 43 mounted about the upper edge of casing 12 bears against the inner surface of heat insulation 40 and provides an effective air seal preventing the escape of the cold air downwardly past this gasket.

Normally, the compact cooler device 10 is stored with the air guard member 38 in its lowered or retracted position. To place the unit in operation, cooler unit 10 is placed in a desired location on a table or the like and the electric service cord, not shown, is connected to a convenient outlet. The motor/compressor operates in a well-known manner to compress the charge of refrigerant gas and to deliver the same into the bottom of condenser 15. Air passing over the finned tubes of the condenser liquifies the compressed gas which passes into receiver 27 and thence through restrictor 30 into evaporator 25. The liquid refrigerant evaporates, absorbing heat from plate 33 and any article resting against this plate in accordance with well-known principles of refrigeration. The gaseous refrigerant then returns to the inlet of the compressor through conduit 26 and is re-liquified and recycled repeatedly in the manner just described.

Air guard 38 may be elevated at any time to a suitable position simply by lifting it until it is at the desired height and then rotating it slightly to place the outer ends of pins 41 in a selected one of the support notches opening laterally from the upright portion of grooves 42. A receptacle 45 containing the food desired to be cooled is placed on cooled plate 33. The cold air cooled by the plate and retained by guard 38 contributes materially in maintaining the dish and its contents cool until served. After the contents of one serving dish have been dispensed, another cooled dish may be substituted and maintained cool until its contents have been served.

Condensate will collect from the air surrounding the serving dish and this condensate collects in trough 35 and drains through one or more tubes 46 onto the heat-dissipating units of the refrigeration unit, such as condenser 15. This cold condensate contributes in cooling the condenser quickly and effectively while the heat being dissipated evaporates this moisture and disperses it back into the atmosphere. Accordingly, no condensate remains to be evaporated by the time this drainage gravitates to the lower convolutions of the condenser. For this reason, it is unnecessary to provide any container for collecting residue condensate, but instead all condensate is used beneficially in maintaining the operation of the refrigeration unit at maximum efficiency.

While the particular self-contained portable cooler for food receptacles herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A self-contained, lightweight, readily-portable cooler for use on a dining table or the like to support and maintain cool a serving dish of foodstuff and adapted to be thereafter carried by one person to a place of storage on a shelf until needed, said cooler comprising a freely ventilated upright tubular casing closed at its upper end and enclosing a complete refrigeration unit including a motor-compressor connected in circuit with an encircling air-cooled condenser, a liquid refrigerant receiver, restrictor means and an evaporator means permitting room air to flow over said condenser to remove heat of condensation therefrom, said evaporator including a heat transfer plate supported horizontally across the upper side by said portable cooler and having a wide surface area adapted to seat against and support the bottom of a food receptacle desired to be maintained cool by said cooler, tubular upright wall means embracing and projecting above said heat transfer plate effective to trap air cooled by said evaporator and hold the same captive about a food receptacle resting on said plate, said tubular wall means having a telescopic fit about said evaporator and the exterior sidewall of said tubular ventilated casing is bodily movable vertically thereof, and means for supporting said tubular wall means in a lower or retracted position for storage and in an upper extended position when in use to trap cool air.

2. A portable cooler as defined in claim 1 characterized in that said upright wall means includes a layer of heat-insulating material.

3. A portable cooler as defined in claim 1 characterized in that said support means for said tubular wall means includes mechanical interlocking means operable to support said wall means selectively at a plurality of different elevated operating position.

4. A portable cooler as defined in claim 3 characterized in the provision of gasket means between said casing for said cooler and said tubular wall means for preventing cool air from escaping therepast in the different elevated positions of said wall means.

5. A portable cooler as defined in claim 1 characterized in the provision of means supporting said tubular casing elevated above a table or the like supporting surface to permit cooling air to enter the bottom of said casing and flow by connection over said motor-compressor and said condenser to remove heat therefrom, and the upper end portion of said casing having large area air outlet passages for the escape of said cooling air.

6. A portable cooler as defined in claim 1 characterized in the provision of means for collecting condensate at the periphery of said evaporator and draining the same onto portions of said refrigeration unit being cooled by atmospheric air and utilizing said condensate to cool such portions of the refrigeration unit.

References Cited

UNITED STATES PATENTS

| | | | |
|---|---|---|---|
| 2,529,439 | 11/1950 | Whitmore | 62—331 |
| 2,657,554 | 11/1953 | Hull | 62—508 |
| 3,012,418 | 12/1961 | Hill | 62—430 |
| 3,001,380 | 9/1961 | Ramey | 62—457X |
| 3,109,299 | 11/1963 | Anderson | 62—457X |
| 3,111,818 | 11/1963 | Dolan et al. | 62—279 |
| 3,308,633 | 3/1967 | Kritzer, Jr. | 165—48 |
| 3,347,060 | 10/1967 | Barkan | 62—457 |

FOREIGN PATENTS

| | | | |
|---|---|---|---|
| 551,916 | 6/1932 | Germany | 62—457 |
| 575,204 | 4/1933 | Germany | 62—279 |

WILLIAM J. WYE, Primary Examiner

U.S. Cl. X.R.

62—458, 507, 508, 256